(12) United States Patent
Kang et al.

(10) Patent No.: US 10,228,462 B2
(45) Date of Patent: Mar. 12, 2019

(54) ULTRASONIC IMAGING APPARATUS AND CONTROL METHOD THEREOF

(71) Applicant: SAMSUNG ELECTRONICS CO., LTD., Suwon-si (KR)

(72) Inventors: Joo Young Kang, Yongin-si (KR); Sung Chan Park, Suwon-si (KR); Jung Ho Kim, Yongin-si (KR); Jong Keun Song, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1030 days.

(21) Appl. No.: 14/527,862

(22) Filed: Oct. 30, 2014

(65) Prior Publication Data
US 2015/0117145 A1    Apr. 30, 2015

(30) Foreign Application Priority Data
Oct. 31, 2013 (KR) .................. 10-2013-0130954

(51) Int. Cl.
*G01S 15/00* (2006.01)
*G01S 15/89* (2006.01)
*G01S 7/52* (2006.01)

(52) U.S. Cl.
CPC ....... *G01S 15/8977* (2013.01); *G01S 7/52047* (2013.01)

(58) Field of Classification Search
USPC .......................................................... 367/7
See application file for complete search history.

(56) References Cited

U.S. PATENT DOCUMENTS

| | | | |
|---|---|---|---|
| 5,383,457 A * | 1/1995 | Cohen .............. | G01S 7/52028 600/443 |
| 7,972,271 B2 * | 7/2011 | Johnson ............ | A61B 8/14 600/459 |
| 8,098,948 B1 | 1/2012 | Tzur et al. | |
| 8,727,990 B2 * | 5/2014 | Kim ................. | G01S 15/8995 600/443 |
| 2004/0054281 A1* | 3/2004 | Adam ............... | A61B 8/587 600/437 |
| 2005/0063611 A1* | 3/2005 | Toki ................. | A61B 6/032 382/299 |

(Continued)

FOREIGN PATENT DOCUMENTS

| | | |
|---|---|---|
| JP | 2006-238032 A | 9/2006 |
| KR | 10-2011-0103205 A | 9/2011 |

(Continued)

*Primary Examiner* — James R Hulka
(74) *Attorney, Agent, or Firm* — Sughrue Mion, PLLC

(57) ABSTRACT

Disclosed herein is an ultrasonic imaging apparatus including: an ultrasonic probe configured to receive ultrasonic waves reflected from an object, and to convert the ultrasonic waves into electrical signals; a beamformer configured to perform beamforming on the electrical signals to thereby generate resultant signals, and to output the resultant signals; an image restorer configured to estimate a first Point Spread Function (PSF) based on an ultrasound image corresponding to the outputted signals, to determine a situational variable of the ultrasound image using the first PSF, to estimate a second PSF based on the situational variable of the ultrasound image, and to generate a restored image for the ultrasound image using the second PSF; and an image filter configured to filter the restored image based on the situational variable of the ultrasound image, and to output the filtered image.

21 Claims, 21 Drawing Sheets

(56) References Cited

U.S. PATENT DOCUMENTS

| | | | |
|---|---|---|---|
| 2005/0101867 A1* | 5/2005 | Johnson | A61B 8/14 600/459 |
| 2007/0083114 A1 | 4/2007 | Yang et al. | |
| 2007/0208254 A1* | 9/2007 | Johnson | A61B 8/14 600/459 |
| 2011/0098565 A1* | 4/2011 | Masuzawa | G01S 7/52047 600/443 |
| 2011/0118604 A1 | 5/2011 | Kim et al. | |
| 2013/0035569 A1* | 2/2013 | Heanue | G01J 3/02 600/322 |
| 2013/0090559 A1* | 4/2013 | Park | A61B 8/5207 600/443 |
| 2013/0202172 A1* | 8/2013 | Weitzel | G06T 11/008 382/131 |
| 2013/0231563 A1* | 9/2013 | Park | A61B 8/5207 600/443 |
| 2013/0289381 A1* | 10/2013 | Oraevsky | A61B 5/7425 600/407 |
| 2014/0031689 A1* | 1/2014 | Kang | G01S 15/8977 600/443 |
| 2014/0336508 A1* | 11/2014 | Kang | G06T 5/20 600/437 |
| 2015/0182122 A1* | 7/2015 | Bamber | A61B 5/0095 600/438 |

FOREIGN PATENT DOCUMENTS

| | | | | |
|---|---|---|---|---|
| KR | 10-2013-0037112 A | | 4/2013 | |
| KR | 20130100607 A | * | 9/2013 | A61B 8/5207 |

* cited by examiner

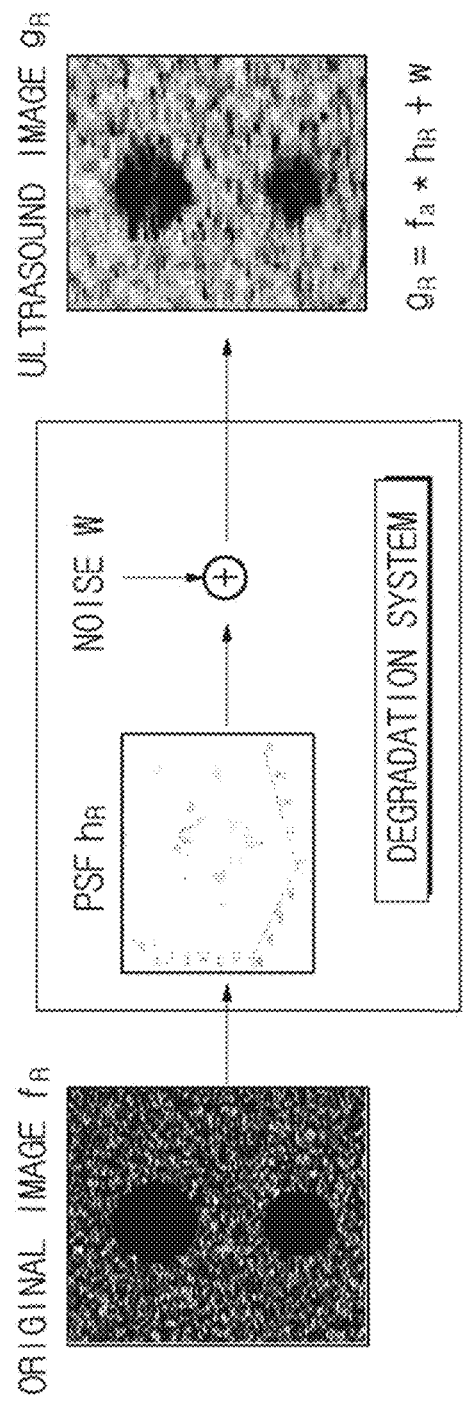

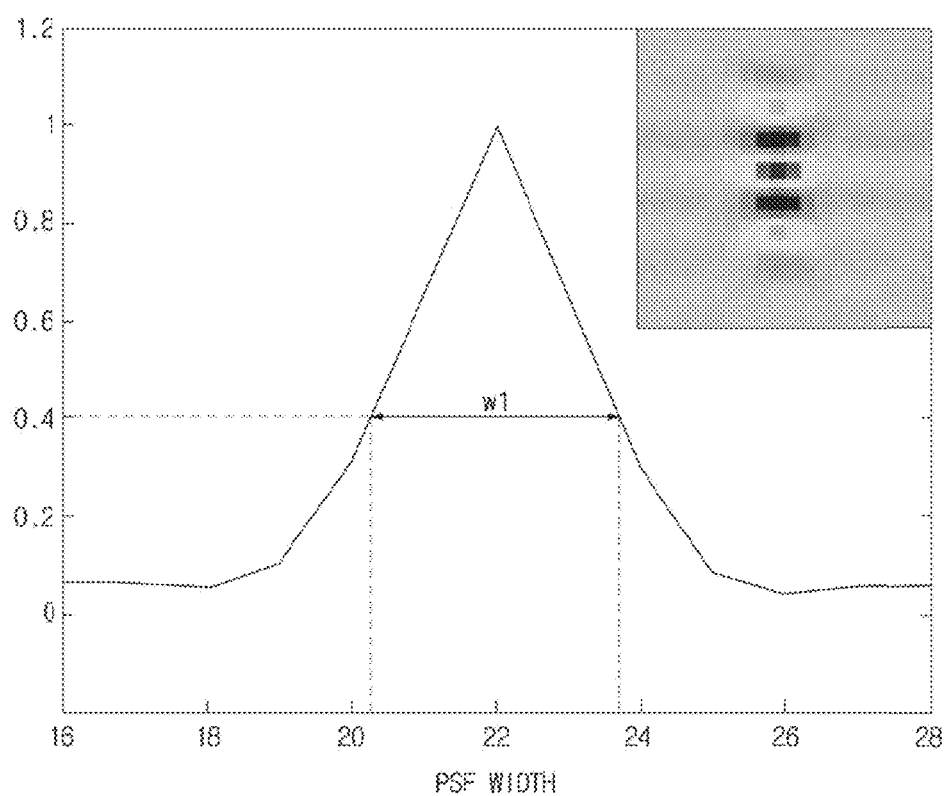

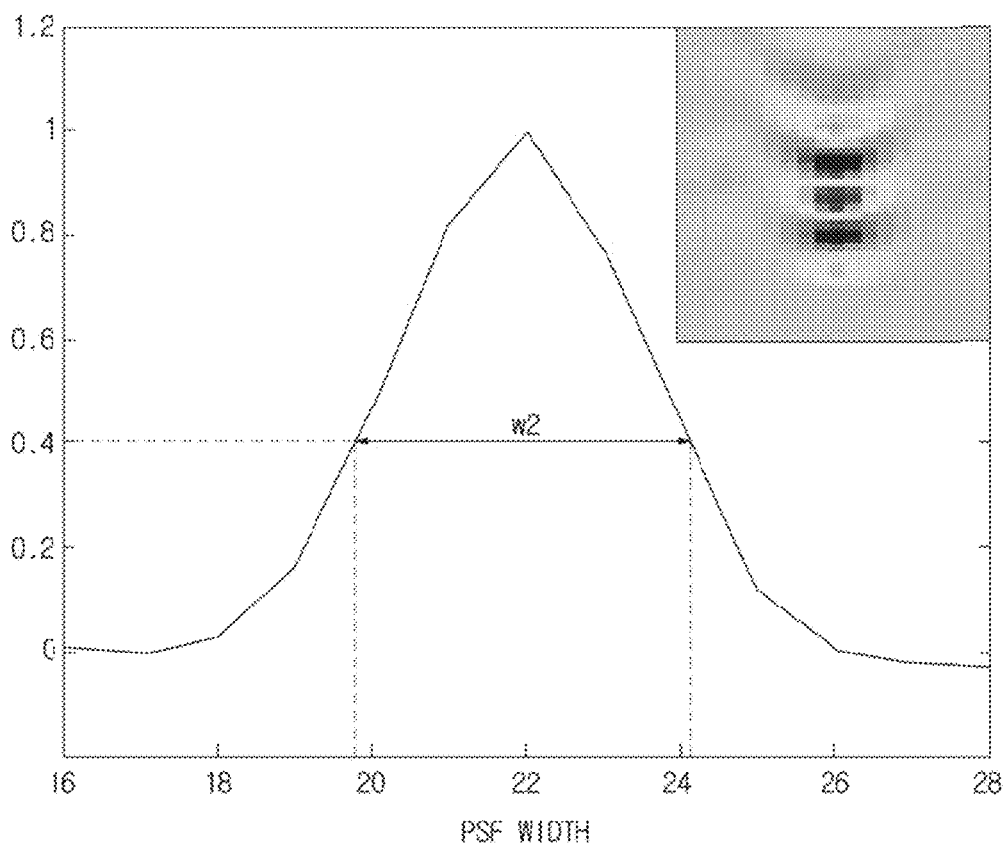

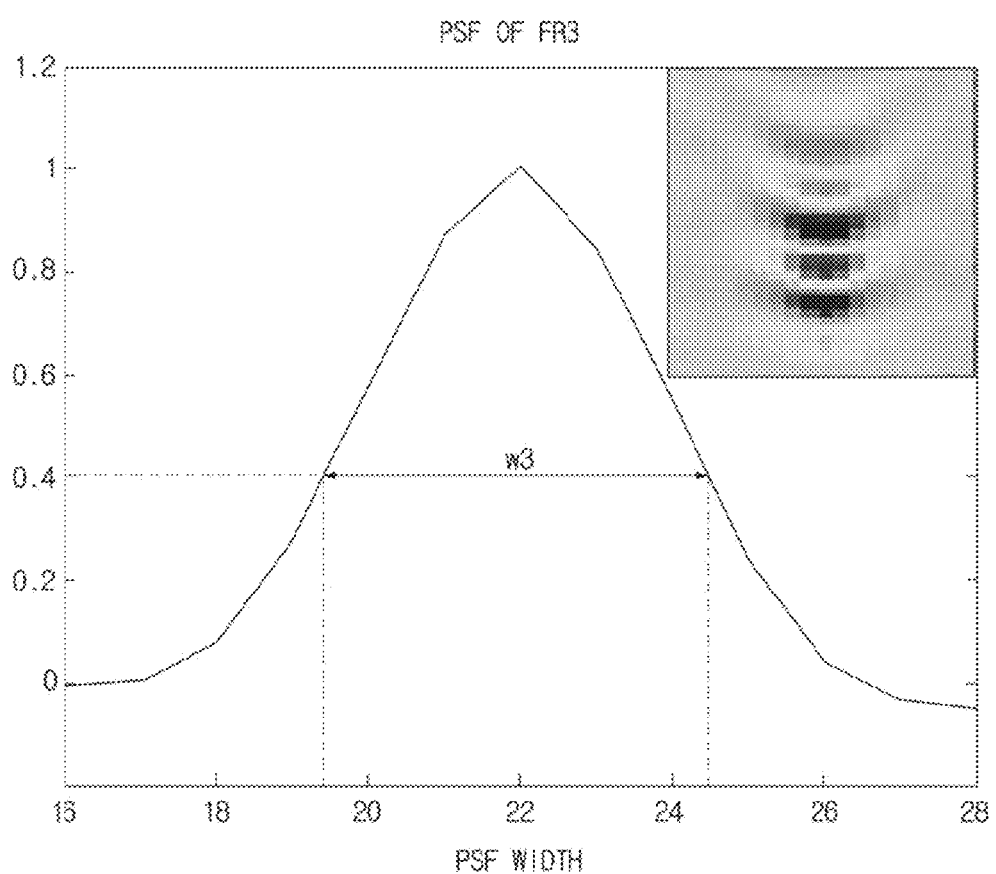

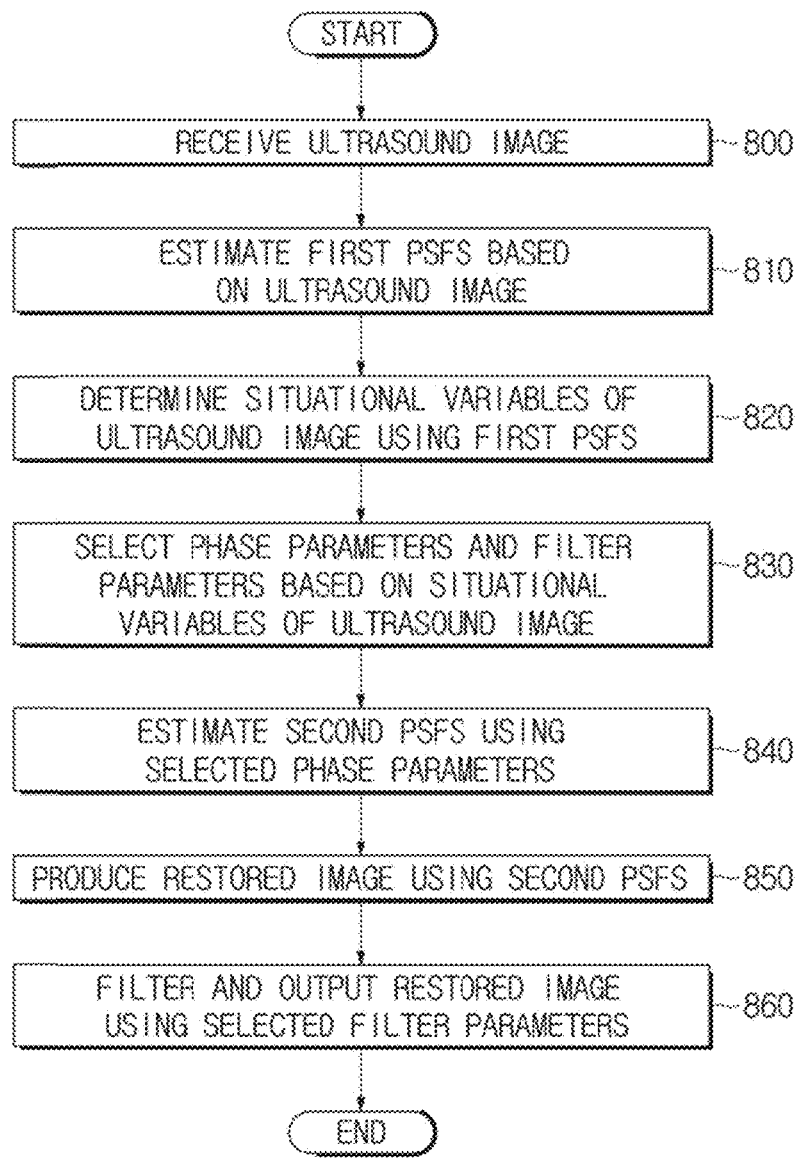

ULTRASONIC IMAGING APPARATUS AND CONTROL METHOD THEREOF

CROSS-REFERENCE TO RELATED APPLICATION

This application claims the benefit of Korean Patent Application No. 2013-0130954, filed on Oct. 31, 2013 in the Korean Intellectual Property Office, the disclosure of which is incorporated herein by reference in its entirety.

BACKGROUND

1. Field

Exemplary embodiments of the present disclosure relate to an ultrasonic imaging apparatus for performing image restoration and filtering based on ultrasound image analysis, and a control method of the ultrasonic imaging apparatus.

2. Description of the Related Art

An ultrasonic imaging apparatus irradiates ultrasonic waves to the inside of an object at the surface of the object, and receives echo ultrasonic waves reflected from the object so as to produce section images about soft tissue of the object or images about blood vessels of the object based on the echo ultrasonic waves, thereby providing information about the object.

The ultrasonic imaging apparatus has advantages in that the ultrasonic imaging apparatus is a compact, low-priced apparatus and has non-invasive and nondestructive properties, compared to other medical imaging apparatuses, such as an X-ray imaging apparatus, a Computerized Tomography (CT) scanner, a Magnetic Resonance Image (MRI) apparatus, and a nuclear medical diagnostic apparatus. Due to these advantages, the ultrasonic imaging apparatus is widely used to diagnose the heart, abdomen, urinary organs, uterus, etc.

The ultrasonic imaging apparatus uses a probe for generating ultrasonic waves in order to acquire an ultrasound image of an object. The probe includes one or more transducers so that each transducer transmits ultrasonic waves to an object and receives echo ultrasonic waves reflected from the object. In order to compensate for time differences with which the echo ultrasonic waves have been received by the transducers, beamforming is performed. The ultrasonic imaging apparatus produces an ultrasound image of the object based on signals subject to beamforming.

SUMMARY

Therefore, it is an aspect of the exemplary embodiments to provide an ultrasonic imaging apparatus for performing image restoration and filtering based on ultrasound image analysis, and a control method of the ultrasonic imaging apparatus.

Additional aspects of the disclosure will be set forth in part in the description which follows and, in part, will be obvious from the description, or may be learned by practice of the disclosure.

In accordance with an aspect of an exemplary embodiment, there is provided an ultrasonic imaging apparatus including: an ultrasonic probe configured to receive ultrasonic waves reflected from an object, and to convert the ultrasonic waves into electrical signals; a beamformer configured to perform beamforming on the electrical signals to thereby generate resultant signals, and to output the resultant signals; an image restorer configured to estimate a first Point Spread Function (PSF) based on an ultrasound image corresponding to the outputted signals, to determine a situational variable of the ultrasound image using the first PSF, to estimate a second PSF based on the situational variable of the ultrasound image, and to generate a restored image for the ultrasound image using the second PSF; and an image filter configured to filter the restored image based on the situational variable of the ultrasound image, and to output the filtered image.

The situational variable may include a frequency component.

The image restorer may be configured to determine the situational variable of the ultrasound image based on a shape of the first PSF.

The image restorer may be configured to select a phase parameter based on the situational variable of the ultrasound image, and estimate the second PSF using the selected phase parameter.

The image filter may be configured to select a filter parameter based on the situational variable of the ultrasound image, and filter the restored image using the selected filter parameter.

The image filter may be configured to select a filter parameter corresponding to a low pass filter for a high-frequency area of the ultrasound image.

The image filter may be configured to select a filter parameter corresponding to a band pass filter for an intermediate-frequency area of the ultrasound image.

The image filter may be configured to select a filter parameter corresponding to a high pass filter for a low-frequency area of the ultrasound image.

The ultrasonic imaging apparatus may further include a storage configured to store at least one phase parameter and at least one filter parameter set in advance according to a frequency component.

The image restorer may be configured to estimate the first PSF and the second PSF using a Cepstrum technique of transforming the ultrasound image into a Cepstrum domain and estimating a 2-Dimensional (2D) PSF in the Cepstrum domain.

The image restorer may be configured to deconvolve the ultrasound image with the second PSF to generate the restored image.

In accordance with another aspect of an exemplary embodiment, there is provided a control method of an ultrasonic imaging apparatus, including: estimating a first Point Spread Function (PSF) based on an ultrasound image; determining a situational variable of the ultrasound image using the first PSF; estimating the second PSF based on the situational variable of the ultrasound image; generating the restored image for the ultrasound image using the second PSF; filtering the restored image based on the situational variable of the ultrasound image; and outputting the filtered image.

The situational variable may include a frequency component.

The determining of the situational variable of the ultrasound image using the first PSF may include determining the situational variable of the ultrasound image based on a shape of the first PSF.

The estimating of the second PSF based on the situational variable of the ultrasound image may include selecting a phase parameter based on the situational variable of the ultrasound image, and estimating the second PSF using the selected phase parameter.

The filtering of the restored image based on the situational variable of the ultrasound image may include selecting a filter parameter based on the situational variable of the ultrasound image, and filtering the restored image using the selected filter parameter.

The filtering of the restored image based on the situational variable of the ultrasound image may include selecting a filter parameter corresponding to a low pass filter for a high-frequency area of the ultrasound image.

The filtering of the restored image based on the situational variable of the ultrasound image may include selecting a filter parameter corresponding to a band pass filter for an intermediate-frequency area of the ultrasound image.

The filtering of the restored image based on the situational variable of the ultrasound image may include selecting a filter parameter corresponding to a high pass filter for a low-frequency area of the ultrasound image.

The estimating of the first PSF or the estimating of the second PSF based on the ultrasound image includes using a Cepstrum technique of transforming the ultrasound image into a Cepstrum domain and estimating a 2-Dimensional (2D) PSF in the Cepstrum domain.

BRIEF DESCRIPTION OF THE DRAWINGS

These and/or other aspects of the exemplary embodiments will become apparent and more readily appreciated from the following description of the exemplary embodiments, taken in conjunction with the accompanying drawings of which:

FIG. 5A is a view for describing a relationship between an original image and an ultrasound image about a target area of an object;

FIGS. 9A, 9B, and 9C are graphs showing first Point Spread Functions (PSFs) estimated based on the ultrasound image shown in FIG. 8;

FIG. 14 is a flowchart illustrating a control method of an ultrasonic imaging apparatus, according to an exemplary embodiment.

DETAILED DESCRIPTION

Figure 1:
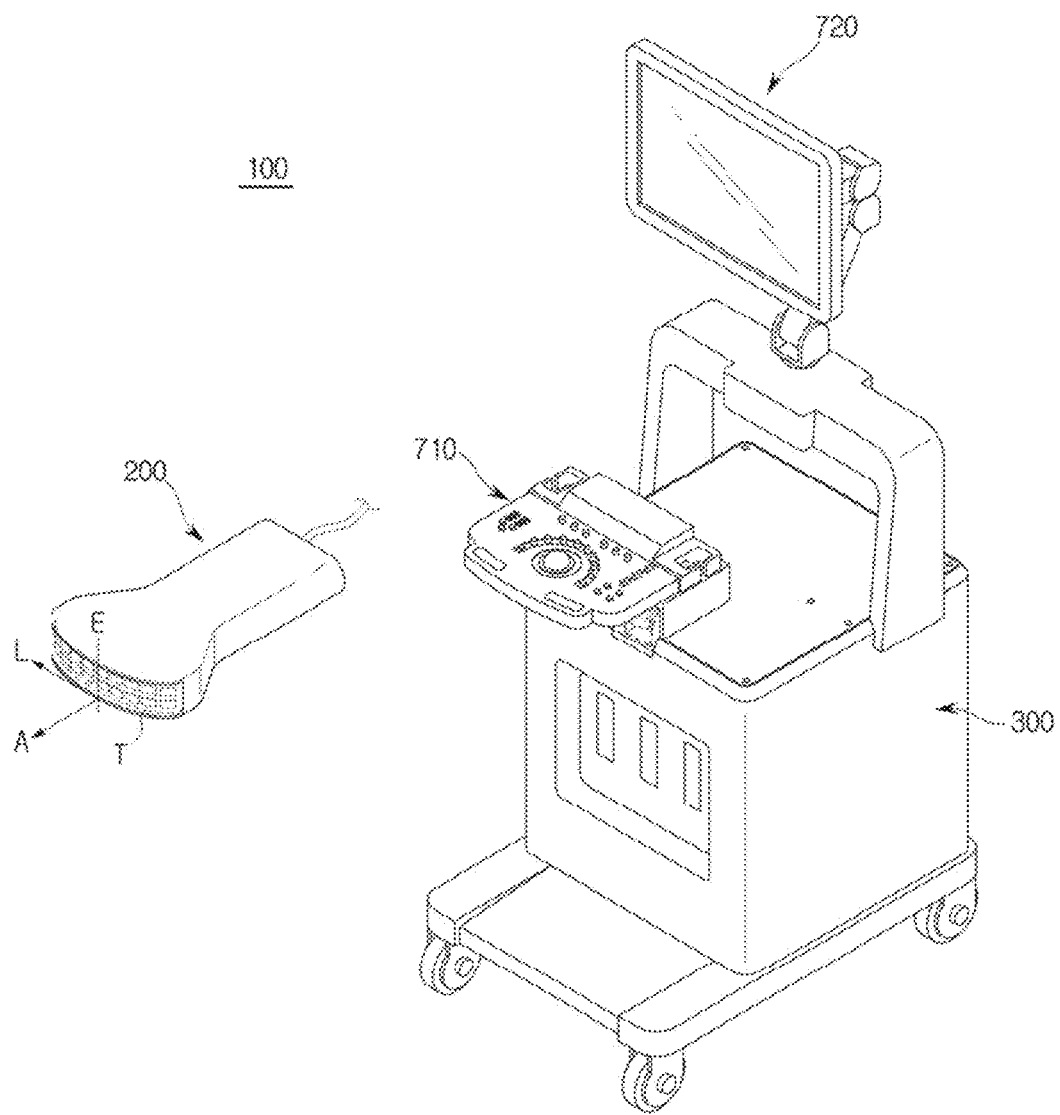
FIG. 1 is a perspective view of an ultrasonic imaging apparatus according to an exemplary embodiment.

Reference will now be made in detail to the exemplary embodiments of the present disclosure, examples of which are illustrated in the accompanying drawings, wherein like reference numerals refer to like elements throughout.

FIG. 1 is a perspective view of an ultrasonic imaging apparatus according to an exemplary embodiment. As illustrated in FIG. 1, an ultrasonic imaging apparatus 100 may include a probe 200, a main body 300, an input unit 710, and a display unit 720.

The probe 200 may be connected to one end of a cable. The other end of the cable may be connected to a male connector (not shown). The male connector connected to the other end of the cable may be physically coupled with one of the female connectors of the main body 300.

The probe 200 may include one or more transducers T. The probe 200 may transmit ultrasonic signals to an object, and receive echo ultrasonic waves reflected from the object, using the transducers T. As illustrated in FIG. 1, the transducers T may be arranged in at least one row in one end of the probe 200.

The object may be a human's or animal's body part, or tissue in a body part, such as vessels, ligaments, and muscles. However, the object is not limited to the above-mentioned body part or tissue, and may be anything having an inner structure which can be imaged by the ultrasonic imaging apparatus 100.

Three directions forming right angles with respect to the center of the transducers T can be defined as an axial direction A, a lateral direction L, and an elevation direction E, respectively. More specifically, a direction in which ultrasonic waves are irradiated is defined as an axial direction A, a direction in which the transducers T form at least one row is defined as a lateral direction L, and the remaining direction perpendicular to the axial direction A and the lateral direction L is defined as an elevation direction E.

The main body 300 may accommodate components (e.g., a transmission signal generator 361 of FIG. 3) of the ultrasonic imaging apparatus 100. If an operator inputs an ultrasonic diagnosis command, the transmission signal generator 361 may generate a transmission signal, and transfer the transmission signal to the probe 200.

The main body 300 may include one or more female connectors (not shown). The male connector (not shown) connected to the cable may be physically coupled with one of the female connectors so that signals are transmitted and received between the main body 300 and the probe 200. For example, a transmission signal generated by the transmission signal generator 361 may be transferred to the probe 200 through the cable and the male connector connected to a female connector of the main body 300.

A plurality of casters for fixing the ultrasonic imaging apparatus 100 at a predetermined location or moving the ultrasonic imaging apparatus 100 in a predetermined direction may be provided on the bottom part of the main body 300.

The input unit 710 allows a user to input a command related to an operation of the ultrasonic imaging apparatus 100. For example, a user may input a diagnosis start command, a command for selecting an area to be diagnosed, a command for selecting a diagnosis type, and a command for selecting a display mode of an image to be output, through the input unit 210. The command input through the input unit 710 may be transmitted to the main body 300 through wired or wireless communication.

The user is a person who diagnoses an object using the ultrasonic imaging apparatus 100, and may be a medical staff member including a doctor, a radiological technologist, and a nurse. However, the user is not limited to the above-mentioned type of people, and may be anyone using the ultrasonic imaging apparatus 100. The display mode may include an Amplitude mode (A mode), a Brightness mode (B mode), a Doppler mode (D mode), an Elastography mode (E mode), and a Motion mode (M mode).

The input unit 710 may include at least one of a keyboard, a mouse, a trackball, a touch screen, a foot switch, and a foot pedal. However, the input unit 710 is not limited to the above-mentioned devices.

The input unit 710 may be placed in the upper part of the main body 300, as illustrated in FIG. 1. However, if the input unit 710 is configured with a foot switch and a foot pedal, the input unit 710 may be placed around the lower part of the main body 300.

If the input unit 710 is configured with a Graphical User Interface such as a touch screen, that is, if the input unit 710 is implemented as software, the input unit 710 may be displayed through the display unit 720 which will be described later.

One or more probe holders for accommodating the probe 200 may be provided around the input unit 710. The user may put the probe 200 into one of the probe holders to safely keep the probe 200 when he or she does not use the ultrasonic imaging apparatus 100.

The display unit 720 may display an image acquired during ultrasonic diagnosis. The display unit 720 may display the image according to a mode selected by the user, and if no mode is selected by the user, the display unit 720 may display the image in a basic mode (e.g., the B mode) set in advance by the user.

The display unit 720 may be, as illustrated in FIG. 1, combined with the main body 300. However, the display unit 720 may be separated from the main body 300. Although not illustrated in FIG. 1, a sub display for displaying an application (e.g., menus and guidance needed for ultrasonic diagnosis) related to operations of the ultrasonic imaging apparatus 100 may be provided.

The display unit 720 may be implemented as a Cathode Ray Tube (CRT), a Liquid Crystal Display (LCD), or a LED display. However, the display unit 710 is not limited to the above-mentioned display devices.

Figure 2:
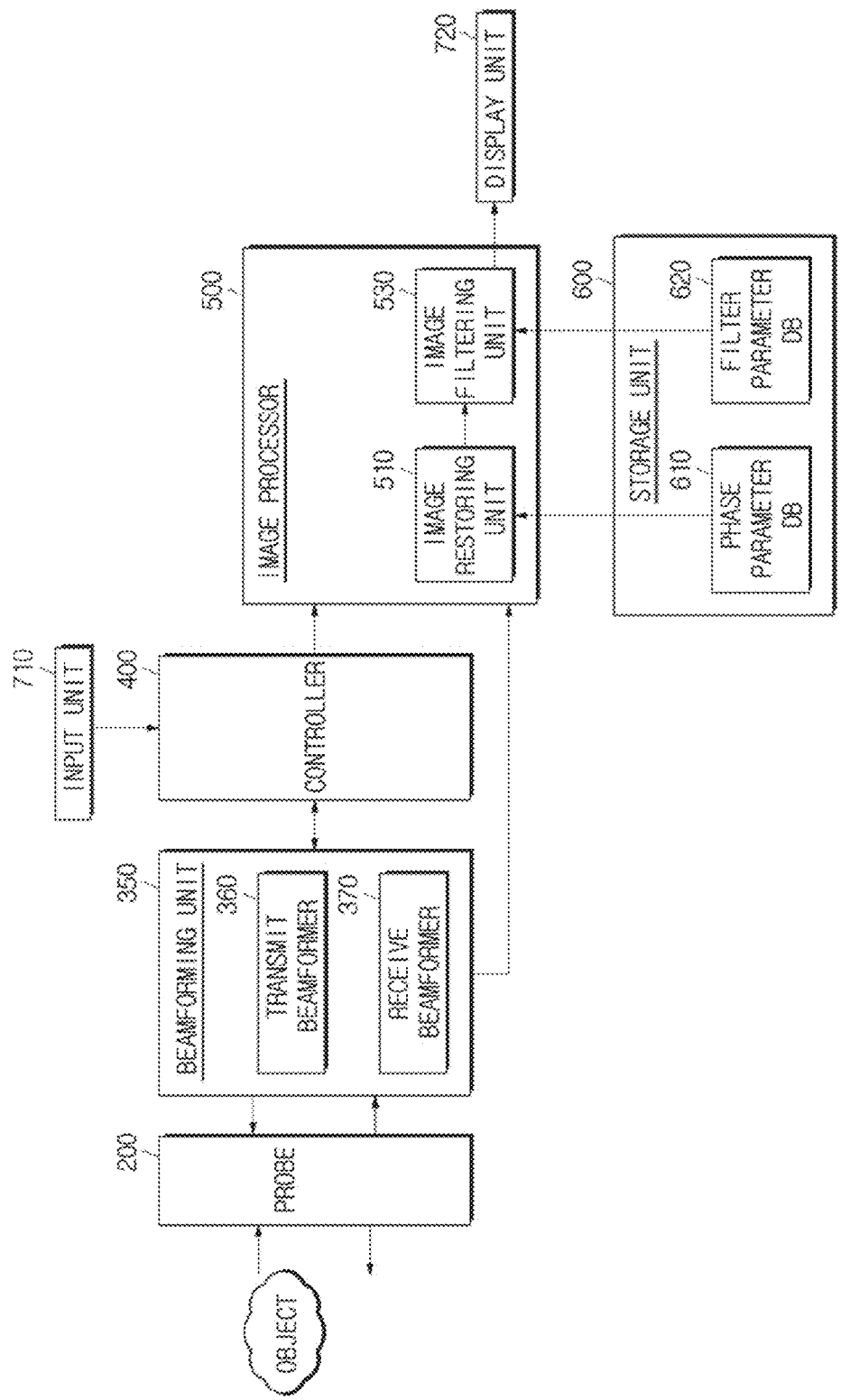
FIG. 2 is a control block diagram illustrating an ultrasonic imaging apparatus according to an exemplary embodiment.

FIG. 2 is a control block diagram illustrating an ultrasonic imaging apparatus according to an exemplary embodiment.

Referring to FIG. 2, an ultrasonic imaging apparatus 100 may produce images about the inside of an object using a probe 200, a beamforming unit 350 (e.g., beamformer), a controller 400, an image processor 500, a storage unit 600 (e.g., storage), an input unit 710 (e.g., inputter), and a display unit 720 (e.g., display).

The controller 400 may control overall operations of the ultrasonic imaging apparatus 100. In detail, the controller 400 may generate a control signal for controlling at least one of a transmit beamformer 360, a receive beamformer 370, the image processor 500, and the display unit 720, according to an instruction or command received through the input unit 710. Also, the controller 400 may generate a control signal for controlling individual components according to an instruction or a command received from an external device through wired or wireless communication.

The probe 200 may include one or more transducers T to transmit ultrasonic waves to an object, to receive echo ultrasonic waves reflected from the object, and to convert electrical signals into ultrasonic waves and vice versa.

More specifically, if the probe 200 receives current from a power source, such as an external power source or an internal power storage unit (e.g., a battery), the individual transducers T vibrate according to the received current to generate ultrasonic waves, and irradiate the ultrasonic waves to an object. The individual transducers T may receive echo ultrasonic waves reflected from the object, and generate current of a frequency corresponding to a vibration frequency while vibrating according to the received echo ultrasonic waves.

Each ultrasonic transducer T may be a magnetostrictive ultrasonic transducer using the magnetostrictive effect of a magnetic material, a capacitive micromachined ultrasonic transducer (CMUT) that transmits and receives ultrasonic waves using vibration of several hundreds or thousands of micromachined thin films, or a piezoelectric ultrasonic transducer using the piezoelectric effect of a piezoelectric material.

The ultrasonic transducers T may be arranged in a linear array, in a convex array, in a phased array, or in a sector array. In this case, the ultrasonic transducers T may be arranged in a line or in a matrix form. If the ultrasonic transducers T are arranged in a line, by swinging the probe 200 in the elevation direction, a plurality of ultrasound images may be acquired. If the ultrasonic transducers T are arranged in a matrix form, by transmitting ultrasonic waves at once, a plurality of ultrasound images may be acquired.

However, the transducers T are not limited to the above-mentioned examples, and may be any other kind of transducers well-known in the art.

The beamforming unit 350 may include the transmit beamformer 360 and the receive beamformer 370. The beamforming unit 350 may convert analog signals into digital signals and vice versa, and adjust time differences with which ultrasonic waves are transmitted from one or more transducers T or time differences with which ultrasonic waves have been received by one or more transducers T.

Figure 3:
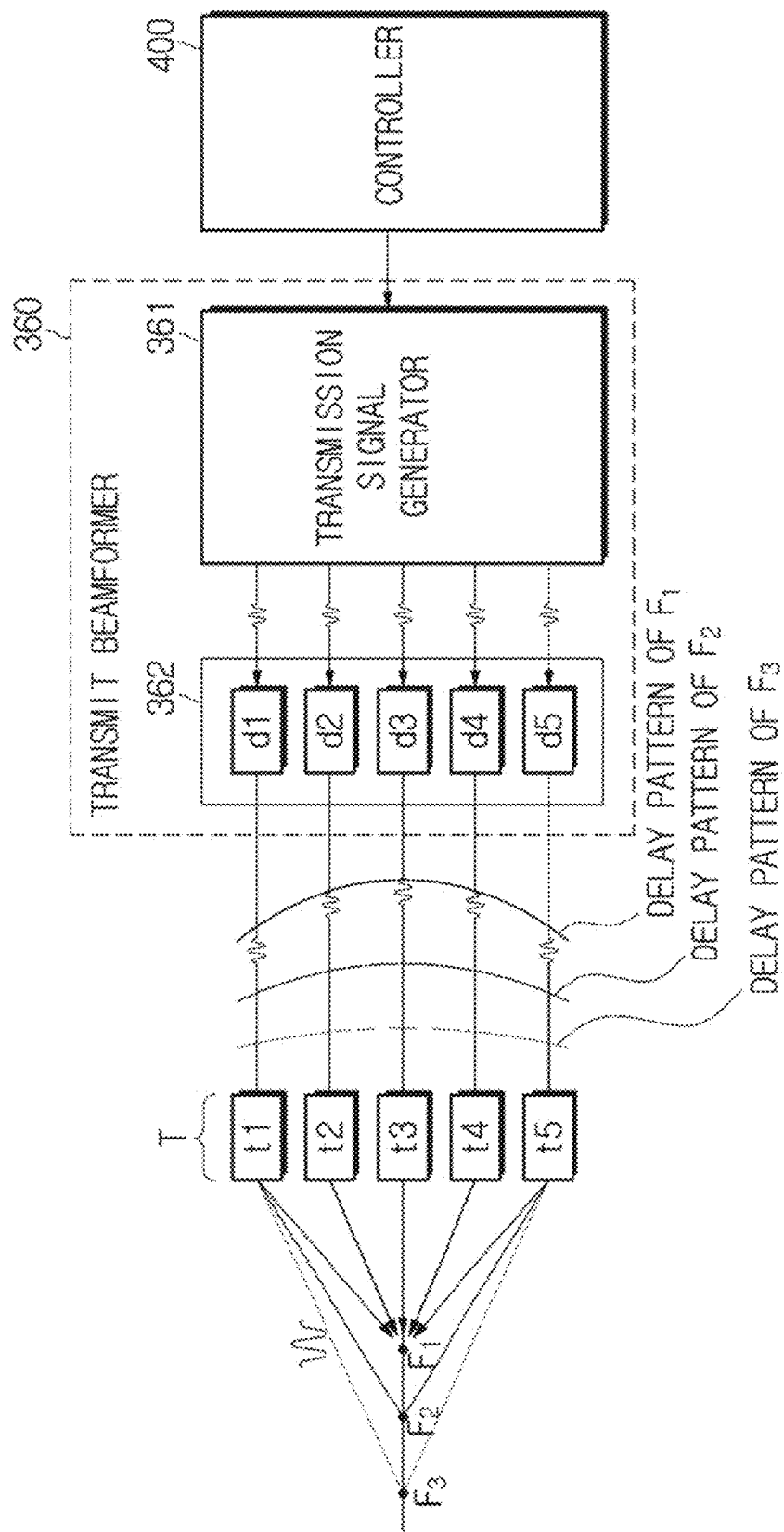
FIG. 3 illustrates a configuration of a transmit beamformer of an ultrasonic imaging apparatus.
Figure 4:
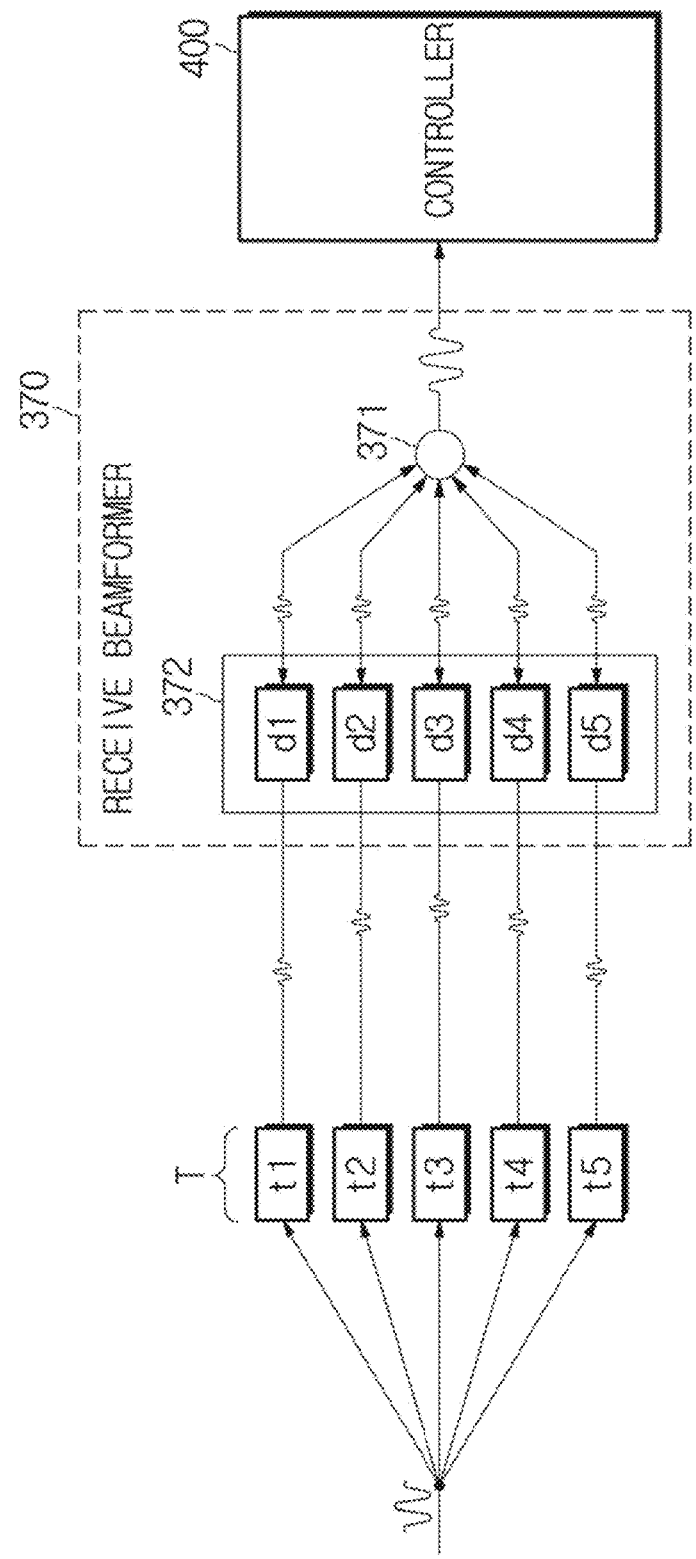
FIG. 4 illustrates a configuration of a receive beamformer of an ultrasonic imaging apparatus.

Hereinafter, a structure and operations of the beamforming unit 350 will be described in detail with reference to FIGS. 3 and 4. FIG. 3 illustrates a configuration of the transmit beamformer 360, and FIG. 4 illustrates a configuration of the receive beamformer 370.

Referring to FIG. 3, the transmit beamformer 360 may perform transmit beamforming using a transmission signal generator 361 and a time delay unit 362. The transmit beamforming is to focus ultrasonic waves generated by one or more transducers T onto a focal point. That is, the transmit beamforming is to cause the transducers T to generate ultrasonic waves in an appropriate order in order to compensate for time differences with which ultrasonic waves generated by one or more transducers T arrive at the focal point.

More specifically, the transmission signal generator 361 of the transmit beamformer 360 may generate one or more transmission signals for one or more transducers T according to a control signal of the controller 400.

The transmission signals may be high-frequency alternating current, and may be generated in correspondence to the number of the transducers T. The transmission signals generated by the transmission signal generator 361 may be transmitted to the time delay unit 362.

The time delay unit 362 may delay the transmission signals to adjust a time at which each transmission signal arrives at the corresponding transducer T. If the transmission signals delayed by the time delay unit 362 are applied to the transducers T, the transducers T generate ultrasonic waves corresponding to the frequencies of the transmission signals. The ultrasonic waves generated by the transducers T are focused onto a focal point. The location of the focal point onto which the ultrasonic waves generated by the transducers T are focused depends on what delay pattern has been applied to the transmission signals.

In more detail, in the exemplary embodiment of FIG. 3, five transducers t1 to t5 are provided, and three delay patterns that can be applied to transmission signals are represented as thick solid lines, medium solid lines, and thin solid lines, respectively.

When the delay pattern represented as the thick solid lines is applied to transmission signals generated by the transmission signal generator 361, ultrasonic waves generated by the transducers t1 to t5 are focused onto a first focal point $F_1$.

When the delay pattern represented as the medium solid lines is applied to transmission signals generated by the transmission signal generator 361, ultrasonic waves generated by the transducers t1 to t5 are focused onto a second focal point $F_2$ which is more distant than the first focal point $F_1$.

When the delay pattern represented as the thin solid lines is applied to transmission signals generated by the transmission signal generator 251, ultrasonic waves generated by the transducers t1 to t5 are focused onto third focal point $F_3$ which is more distant than the second focal point $F_2$.

As described above, the location of a focal point varies according to what type of delay pattern is applied to transmission signals generated by the transmission signal generator 361. Accordingly, when a delay pattern is applied, ultrasonic waves that are to be applied to an object are focused onto a fixed focal point (fixed-focusing). However, when two or more different delay patterns are applied, ultrasonic waves that are to be applied to an object are focused onto several focal points (multi-focusing).

As such, ultrasonic waves generated by the individual transducers T are fixed-focused onto a single focal point, or multi-focused onto several focal points. The focused ultrasonic waves are directed to the inside of an object. The ultrasonic waves directed to the inside of the object are reflected from a target area of the object. Echo ultrasonic waves reflected from the target area are received by the transducers T. Then, the transducers T convert the received echo ultrasonic waves into electrical signals. Hereinafter, the converted electrical signals will be simply referred to as reception signals S. The reception signals S output from the transducers T are amplified and filtered, then converted into digital signals, and provided to the receive beamformer 370.

Referring to FIG. 4, the receive beamformer 370 may include a time-difference corrector 372 and a focusing unit 371 to perform receive beamforming on the reception signals S converted into the digital signals. The receive beamforming is to correct time differences between the reception signals S output from the individual transducers T and then to focus the corrected signals.

More specifically, the time-difference corrector 372 may delay the reception signals S output from the individual transducers T by predetermined time periods so that the reception signals S can be transferred to the focusing unit 371 at the same time.

The focusing unit 371 may focus the reception signals S subject to time-difference correction by the time-difference corrector 372. At this time, the focusing unit 371 may focus the reception signals S after allocating a predetermined weight (for example, a beamforming coefficient) to each reception signal S to enhance or attenuate the corresponding reception signal rather than the other reception signals. The focused reception signals may be provided to the image processor 500. The signals provided to the image processor 500 can be defined as input signals I.

Referring again to FIG. 2, the image processor 500 may include an image restoring unit 510 (e.g., image restorer) and an image filtering unit 530 (e.g., image filter), and the storage unit 600 may include phase parameter database (DB) 610 to store phase parameters that are provided to the image restoring unit 510, and filter parameter database (DB) 620 to store filter parameters that are provided to the image filtering unit 530.

The image restoring unit 510 may estimate Point Spread Functions (PSFs), and perform deconvolution based on the PSFs to thus acquire a restored image that looks similar to an original image of the target area. The original image, the restored image, and the image restoring unit 510 will be described in more detail with reference to FIGS. 5A to 9C, below.

Figure 5B:
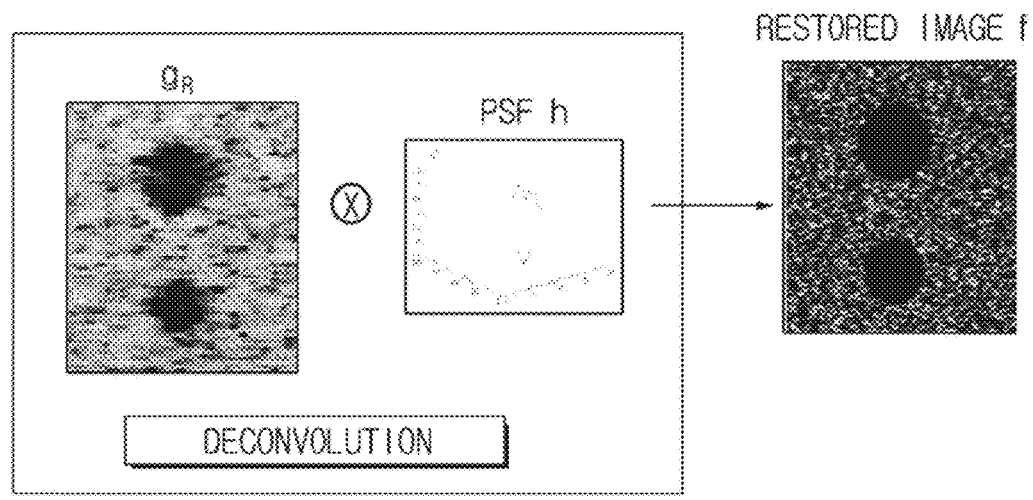
FIG. 5B is a view for describing a relationship between an ultrasound image and a restored image about a target area of an object.

FIG. 5A is a view for describing a relationship between an original image and an ultrasound image about a target area of an object, and FIG. 5B is a view for describing a relationship between the ultrasound image and a restored image about the target area of the object.

FIG. 5A shows an original image $f_R$ and an ultrasound image $g_R$ in left and right sides, respectively. FIG. 5B shows the ultrasound $g_R$ and a restored image f in left and right sides, respectively. The original image $f_R$ is an ideal image of a target area of an object. The ultrasound image $g_R$ is an image corresponding to the input signals I described above. The restored image f is an image restored from the ultrasound image $g_R$ such that the image looks similar to the original image $f_R$.

The input signals I are provided through transmission or reception of ultrasonic waves by the probe 200 and beamforming by the beamforming unit 350. That is, the input signals I may have been modified due to the technical properties or physical properties of the probe 200 or the beamforming unit 350, and added with noise. Accordingly, the ultrasound image $g_R$ produced based on the input signals I may have degraded image quality due to blurred edges and noise, compared to the original image $f_R$, as shown in FIG. 5A. Now, a relationship between the original image $f_R$ and the ultrasound image $g_R$ will be described in more detail with reference to FIGS. 6A and 6B.

Figure 6A:
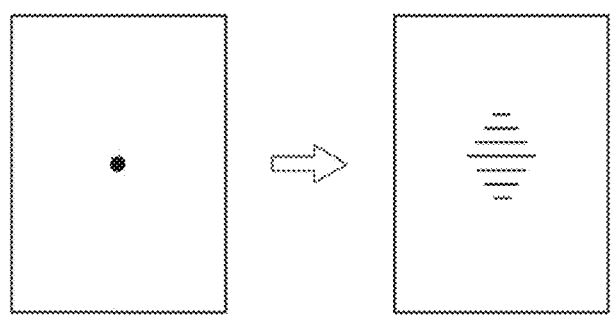
FIG. 6A illustrates an original image and an ultrasound image of a target area.

FIG. 6A illustrates an original image and an ultrasound image of a target area in the left and right sides, respectively. Referring to FIG. 6A, if the target area is represented as a dot in the original image, the target area of the ultrasound image is represented as a shape spread out to the up, down, left, and right of the dot. The difference between the original image and the ultrasound image is more significant at the deeper depth of the target area. Here, a direction in which the depth is deeper can be defined as a direction in which a distance from the probe increases in the axial direction A.

Figure 6B:
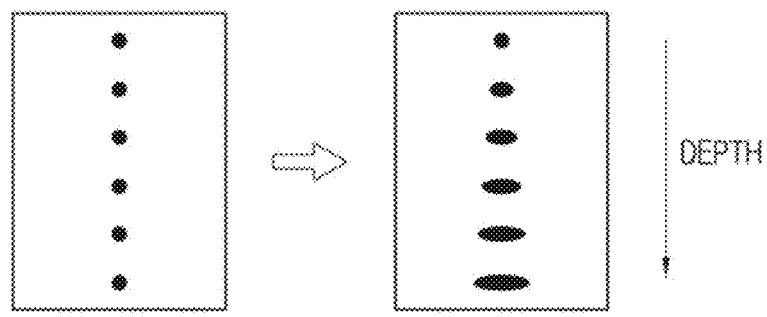
FIG. 6B illustrates an original image and an ultrasound image of a plurality of target areas located at different depths.

FIG. 6B illustrates an original image of target areas having different depths in the left side, and an ultrasound image of the target areas in the right side. Referring to FIG. 6B, target areas located closer to the probe 200 (see FIG. 2) show more similar shapes between the original image and the ultrasound image. However, target areas located more distant from the probe 200 show significantly different shapes between the original image and the ultrasound image.

As described above, due to noise and the technical properties or physical properties of the probe 200 or the beamforming unit 350 (see FIG. 2), the quality of an ultrasound image $g_R$ is degraded compared to an original image $f_R$. When a modification due to the technical properties or physical properties of the probe 200 or the beamforming unit 350 is represented by a PSF $h_R$, and noise is represented by w, a relationship between the original image $f_R$ and the ultrasound image $g_R$ can be expressed in a spatial domain as Equation (1), below.

$$g_R(m,n) = f_R(m,n) * h_R(m,n) + w(m,n),\quad\text{Equation (1)}$$

where $f_R$ represents the original image, $g_R$ represents the ultrasound image, $h_R$ represents the PSF, w represents noise, and * represents convolution.

If no noise is added, the ultrasound image $g_R$ can be represented by convolution of the original image $f_R$ and the PSF $h_R$. Accordingly, if the PSF $h_R$ is given, the original image $f_R$ corresponding to the ultrasound image $g_R$ will be able to be obtained by deconvolving the ultrasound image $g_R$ with the PSF $h_R$.

Figure 7:
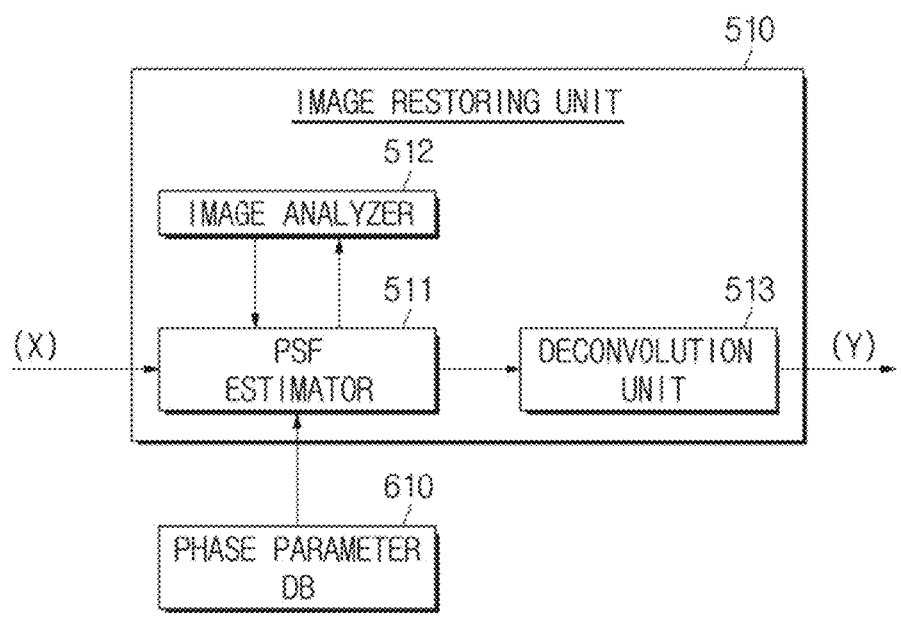
FIG. 7 is a block diagram illustrating an image restoring unit according to an exemplary embodiment.

Therefore, as illustrated in FIG. 5B, the image restoring unit 510 may estimate an appropriate PSF h, and deconvolve the estimated PSF h with the ultrasound image $g_R$, thereby acquiring a restored image f that looks identical or similar to the original image $f_R$ of the target area. A configuration of the image restoring unit 510 (see FIG. 2) for obtaining the restored image h is illustrated in FIG. 7. FIG. 7 is a block diagram illustrating the image restoring unit 510 according to an exemplary embodiment.

Referring to FIG. 7, the image restoring unit 510 may include a PSF estimator 511, an image analyzer 512, and a deconvolution unit 513 (e.g., deconvolutor).

The PSF estimator 511 may estimate first PSFs and second PSFs for an ultrasound image corresponding to input signals. Each of the first PSFs and the second PSFs is a group of at least one PSF, and may include only a 1-Dimensional (1 D) PSF(s) or only a 2-Dimensional (2D) PSF(s). Also, each of the first PSFs and the second PSFs may include all of a 1D PSF(s) and a 2D PSF(s). According to an exemplary embodiment, each of the first PSFs and the second PSFs may include a higher-dimensional PSF(s), such as a 3-Dimensional (3D) PSF(s) or a 4-Dimensional (4D) PSF(s).

An example of a method of estimating 1D PSFs is Autoregressive Moving Average (ARMA). 1D PSFs can be estimated rapidly, but may have low accuracy.

An example of a method of estimating 2D PSFs is Cepstrum. Cepstrum is used to transform an ultrasound image in a spatial domain into a Cepstrum domain, and then to estimate 2D PSFs in the Cepstrum domain.

Cepstrum is classified into a method of estimating 2D PSFs using only magnitude information of an ultrasound image, and a method of estimating 2D PSFs using both magnitude information and phase information of an ultrasound image. The method of estimating 2D PSFs using only magnitude information of an ultrasound image ensures high estimation speed, and the method of estimating 2D PSFs using both magnitude information and phase information of an ultrasound image ensures high estimation accuracy.

The PSF estimator 511 may estimate 1D PSFs or other dimensional PSFs, using one of the methods described above. Hereinafter, for convenience of description, an example of estimating 2D PSFs using Cepstrum will be described.

First, the PSF estimator 511 may estimate 1D PSFs using only magnitude information of an ultrasound image. This operation will be described in more detail with reference to Equations (2) to (6), below. Equation (2) is:

$$\hat{g}_R(m,n) = DFT^{-1}\{\log|DFT\{g_R(m,n)\}|\},\quad\text{Equation (2)}$$

where $g_R$ represents the ultrasound image defined in Equation (1), DFT represents Discrete Fourier Transform, and log represents a logarithm function.

Equation (2) is used to remove noise w from the ultrasound image $g_R$ of Equation (1), to perform DFT, to transform the resultant image into a linear form using the logarithm function, and to perform Inverse Discrete Fourier Transform (IDFT), thereby transforming the ultrasound image $g_R$ into an ultrasound image $\hat{g}_R$ in the Cepstrum domain. Equation (3) is:

$$\hat{h}_R(m,n) = \hat{g}_R(m,n) \cdot \frac{1}{1+\left(\frac{m^2}{D_m}+\frac{n^2}{D_n}\right)^r}\quad\text{Equation (3)}$$

Equation (3) is used to obtain a PSF $\hat{h}_R$ in the Cepstrum domain from the ultrasound image $\hat{g}_R$ in the Cepstrum domain, expressed in Equation (2), using a butterworth filter. Equation (4) is:

$$h_1(m,n) = DFT^{-1}[\exp\{DFT\{\hat{h}_R(m,n)\}\}]\quad\text{Equation (4)}$$

where exp represents an exponential function.

Equation (4) is used to transform the PSF $\hat{h}_R$ in the Cepstrum domain, obtained by Equation (3), into a PSF $h_1$ in the spatial domain.

The PSF estimator 511 may estimate the PSF $h_1$ obtained using Equations (2) to (4) described above, as a first PSF. Equation (5) is:

$$\hat{h}(m,n)_{min} = \hat{h}_R(m,n) \cdot a(m,n)_{min},\quad\text{Equation (5)}$$

$$a(m,n)_{min} = \begin{cases} 1 & (n=0) \\ 2 & (n>0) \\ 0 & (\text{otherwise}) \end{cases}$$

Equation (5) is used to apply a window $a_{min}$ to the PSF $\hat{h}_R$ of Equation (3) and thus obtain a new PSF $\hat{h}_{min}$. Accordingly, the PSF $\hat{h}_{min}$ is a PSF in the Capstrum domain, like the PSF $\hat{h}_R$. Equation (6) is:

$$\hat{h}(m,n)_{max} = \hat{h}_R(m,n) \cdot a(m,n)_{max},\quad\text{Equation (6)}$$

$$a(m,n)_{min} = \begin{cases} 1 & (n=0) \\ 2 & (n<0) \\ 0 & (\text{otherwise}) \end{cases}$$

Equation (6) is used to apply a window $a_{max}$ to the PSF $\hat{h}_R$ of Equation (3) and thus obtain another PSF $\hat{h}_{max}$. Likewise, the PSF $\hat{h}_{max}$ is a PSF in the Capstrum domain.

The PSF estimator 511 may estimate PSFs $h_{min}$ and $h_{max}$ obtained by transforming the PSFs $\hat{h}_{min}$ and $\hat{h}_{max}$ of Equations (5) and (6) into the spatial domain, as first PSFs.

Since the PSF estimator 511 obtains the first PSFs (that is, $h_1$, $h_{min}$, and $h_{max}$) in consideration of only magnitude information of the ultrasound image $g_R$, the PSF estimator 511 may estimate the first PSFs rapidly. However, in order to increase accuracy of estimation, the PSF estimator 511 may estimate second PSFs based on the first PSFs.

Before a method of estimating second PSFs is described, the image analyzer 512 and the phase parameter DB 610 of the storage unit 600 (see FIGS. 2 and 7) will be described, below.

The image analyzer 512 may analyze situational variables of the ultrasound image using the first PSFs estimated by the PSF estimator 511.

The situational variables may include a kind of a probe that produces the ultrasound image, a distance (that is, a depth of a target area) between the probe and the target area, sound velocity of ultrasonic waves, and frequency components of the ultrasound image. For convenience of description, in the following description, the situational variables of the ultrasound image are assumed to be frequency components of the ultrasound image.

Figure 8:
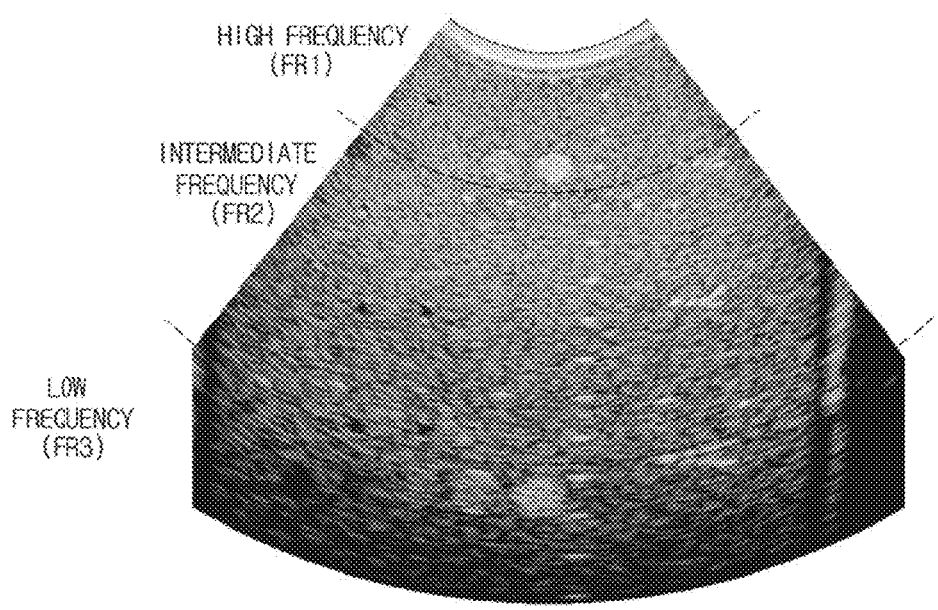
FIG. 8 shows an example of an ultrasound image.

A process of analyzing frequency components of an ultrasound image will be described with reference to FIGS. 8 to 9C, below. FIG. 8 shows an example of an ultrasound image, and FIGS. 9A, 9B, and 9C are graphs showing first PSFs estimated based on the ultrasound image shown in FIG. 8.

More specifically, FIG. 9A is a graph of a first PSF corresponding to a FR1 area in the ultrasound image of FIG. 8, FIG. 9B is a graph of a first PSF corresponding to a FR2 area in the ultrasound image of FIG. 8, and FIG. 9C is a graph of a first PSF corresponding to a FR3 area in the ultrasound image of FIG. 8. In the upper right parts of FIGS. 9A, 9B, and 9C, graphs of 2D PSFs are shown, and in the lower left parts of FIGS. 9A, 9B, and 9C, graphs of 1D PSFs (section graphs in the lateral direction of the 2D PSFs) are shown.

Referring to FIGS. 9A, 9B, and 9C, a degree of spreading out to the up, down, left, and right of the 2D PSF corresponding to the FR2 area is less than a degree of spreading out to the up, down, left, and right of the 2D PSF corresponding to the FR3 area, but more than a degree of spreading out to the up, down, left, and right of the 2D PSF corresponding to the FR1 area.

Likewise, a degree w2 of spreading out to the left and right of the 1D PSF corresponding to the FR2 area is less than a degree w3 of spreading out to the left and right of the 1D PSF corresponding to the FR3 area, but more than a degree of spreading out to the left and right of the 1D PSF corresponding to the FR1 area.

The image analyzer 512 may compare the shapes or the degrees of spreading of the first PSFs to determine the FR1 area having a small degree of spreading of the first PSF as a high-frequency area, the FR3 area having a great degree of spreading of the first PSF as a low-frequency area, and the FR2 area having an intermediate degree of spreading of the first PSF as an intermediate-frequency area. The high-frequency area refers to an area having more high-frequency components than an intermediate-frequency area or a low-frequency area, and the low-frequency area refers to an area having more low-frequency components than an intermediate-frequency area or a high-frequency area.

The phase parameter DB 610 may store phase parameters set in advance according to frequency components. The phase parameters may be defined as phase information used to estimate second PSFs that are new groups of PSFs, based on the first PSFs.

If a phase parameter for high-frequency has been set to $(\alpha_1, \beta_1)$, a phase parameter for intermediate-frequency has been set to $(\alpha_2, \beta_2)$, and a phase parameter for low-frequency has been set to $(\alpha_3, \beta_3)$, the phase parameter DB 610 may store a phase parameter for high-frequency as $(\alpha_1, \beta_1)$, a phase parameter for intermediate-frequency as $(\alpha_2, \beta_2)$, and a phase parameter for low-frequency as $(\alpha_3, \beta_3)$.

The phase parameter DB 610 may be Read Only Memory (ROM), Programmable Read Only Memory (PROM), Erasable Programmable Read Only Memory (EPROM), a non-volatile memory device such as flash memory, a volatile memory device such as Random Access Memory (RAM), a hard disk, or an optical disk. However, the phase parameter DB 610 is not limited to these, and may be any other storage device well-known in the art.

The PSF estimator 511 may select phase parameters from the phase parameter DB 610 based on the frequency components of the ultrasound image, and estimate the second PSFs using the selected phase parameters.

Referring again to the ultrasound image shown in FIG. 8, since the FR1 area is a high-frequency area, the PSF estimator 511 may select the phase parameter $(\alpha_1, \beta_1)$ corresponding to high-frequency among phase parameters stored in the phase parameter DB 610, for the FR1 area. Also, since the FR2 area is an intermediate-frequency area, the PSF estimator 511 may select the phase parameter $(\alpha_2, \beta_2)$ corresponding to intermediate-frequency among the phase parameters stored in the phase parameter DB 610, for the FR2 area. Likewise, since the FR3 area is a low-frequency area, the PSF estimator 511 may select the phase parameter $(\alpha_3, \beta_3)$ corresponding to low-frequency among the phase parameters stored in the phase parameter DB 610, for the FR3 area.

If at least one phase parameter is selected as described above, the PSF estimator 511 may estimate second PSFs using the selected phase parameters as coefficients. This operation will be described in detail with reference to Equations (7) and (8), below. Equation (7) is:

$$\hat{h}(m,n) = \alpha \cdot \hat{h}(m,n)_{min} + \beta \cdot \hat{h}(m,n)_{max}, \quad \text{Equation (7)}$$

where $(\alpha, \beta)$ represents a phase parameter, $\hat{h}_{min}$ represents a first PSF in the Cepstrum domain obtained by Equation (5), and $\hat{h}_{max}$ represents a first PSF in the Cepstrum domain obtained by Equation (6).

For the high-frequency area of the ultrasound image, a PSF $\hat{h}$ is obtained by using $(\alpha_1, \beta_1)$ as a coefficient, that is, by applying $(\alpha_1, \beta_1)$ to the phase parameter $(\alpha, \beta)$. The PSF $\hat{h}$ can be defined as $\hat{h}_{21}$. For the intermediate-frequency area of the ultrasound image, a PSF $\hat{h}$ is obtained by using $(\alpha_2, \beta_2)$ as a coefficient, and the PSF $\hat{h}$ can be defined as $\hat{h}_{22}$. For the low-frequency area of the ultrasound image, a PSF $\hat{h}$ is obtained by using $(\alpha_3, \beta_3)$ as a coefficient, and the PSF $\hat{h}$ can be defined as $\hat{h}_{23}$. The PSFs $\hat{h}_{21}$, $\hat{h}_{22}$, and $\hat{h}_{23}$ are PSFs in the Cepstrum domain. Equation (8) is:

$$h_2(m,n) = DFT^{-1}[\exp\{DFT\{\hat{h}(m,n)\}\}] \quad \text{Equation (8)}$$

Equation (8) is used to transform the PSF $\hat{h}$ in the Cepstrum domain, obtained by Equation (7), into a PSF $h_2$ in the spatial domain. As such, a PSF obtained by transforming $\hat{h}_{21}$ obtained by Equation (7) into the spatial domain is defined as $h_{21}$, a PSF obtained by transforming $\hat{h}_{22}$ into the spatial domain is defined as $h_{22}$, and a PSF obtained by transforming $\hat{h}_{23}$ into the spatial domain is defined as $h_{23}$.

The PSF estimator 511 may estimate at least one PSF $h_2$ obtained by Equations (7) and (8), as a second PSF. More specifically, the PSF estimator 511 may estimate $h_{21}$ as a second PSF corresponding to the high-frequency area, $h_{22}$ as a second PSF corresponding to the intermediate-frequency area, and $h_{23}$ as a second PSF corresponding to the low-frequency area, respectively.

As described above, the PSF estimator 511 may estimate the second PSFs using the first PSFs and the phase parameters. In other words, the PSF estimator 511 may estimate the second PSFs in consideration of both magnitude information and phase information of the ultrasound image. Accordingly, the second PSFs are closer to ideal PSFs than the first PSFs estimated in consideration of only the magnitude information of the ultrasound image.

After the PSF estimator 511 estimates the second PSFs, the deconvolution unit 513 illustrated in FIG. 7 may deconvolve the second PSFs with the ultrasound image to produce a restored image for the ultrasound image.

For example, since the second PSF $h_{21}$ has been estimated for the high-frequency area of the ultrasound image, the second PSF $h_{22}$ has been estimated for the intermediate-frequency area of the ultrasound image, and the second PSF $h_{23}$ has been estimated for the low-frequency area of the ultrasound image by Equation 8, the deconvolution unit 513 may deconvolve the high-frequency area of the ultrasound image with $h_{21}$, the intermediate-frequency area of the ultrasound image with $h_{22}$, and the low-frequency area of the ultrasound image with $h_{23}$, thereby producing a restored image for the entire area of the ultrasound image.

Referring again to FIG. 2, the image filtering unit 530 may select filter parameters from the filter parameter DB 620, based on the frequency components of the ultrasound image, and filter the restored image using the selected filter parameters. Each filter parameter may be defined as a factor for determining a type of a filter for filtering a restored image.

Figure 10:
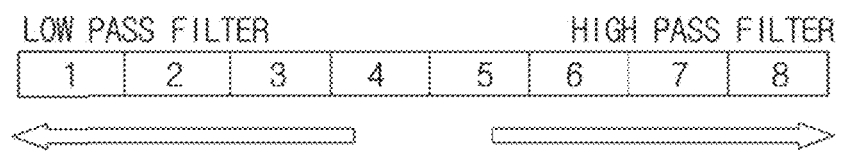
FIG. 10 illustrates an example of a filter parameter database (DB)

FIG. 10 illustrates an example of the filter parameter DB 620.

In FIG. 10, the filter parameter DB 620 may store filter parameters of 1 to 8. Selecting the filter parameter of 1, 2, or 3 corresponds to selecting a Low Pass Filter (LPF), selecting the filter parameter of 4 or 5 corresponds to selecting a Band Pass Filter (BPF), and selecting the filter parameter of 6, 7, or 8 corresponds to selecting a High Pass Filter (HPF). The smaller the filter parameter that is selected, the lower the cutoff frequency of the LPF becomes, and the greater the filter parameter that is selected, the higher the cutoff frequency of the HPF becomes.

The filter parameter DB 620 may be, like the phase parameter DB 610, implemented as Read Only Memory (ROM), Programmable Read Only Memory (PROM), Erasable Programmable Read Only Memory (EPROM), a non-volatile memory device such as flash memory, a volatile memory device such as Random Access Memory (RAM), a hard disk, or an optical disk. However, the filter parameter DB 620 is not limited to these, and may be any other storage device well-known in the art.

The image filtering unit 530 may select a filter parameter corresponding to an LPF for the high-frequency area of the ultrasound image. In the example of FIG. 10, the image filtering unit 530 may select a filter parameter of 1, 2, or 3. Also, the image filtering unit 530 may select a filter parameter corresponding to a BPF for the intermediate-frequency area of the ultrasound image. In the example of FIG. 10, the image filtering unit 530 may select a filter parameter of 4 or 5. Also, the image filtering unit 530 may select a filter parameter corresponding to an HPF for the high-frequency area of the ultrasound image. In the example of FIG. 10, the image filtering unit 530 may select a filter parameter of 6, 7, or 8.

If at least one filter parameter is selected as described above, the image filtering unit 530 may apply filters corresponding to the selected filter parameters to the restored image.

More specifically, if an area corresponding to the high-frequency area of the ultrasound image in the restored image is defined as a first area, an area corresponding to the intermediate-frequency area of the ultrasound image in the restored image is defined as a second area, and an area corresponding to the low-frequency area of the ultrasound image in the restored image is defined as a third area, the image filtering unit 530 may apply an LPF to the first area, a BPF to the second area, and an HPF to the third area, respectively.

Since the LPF is applied to the first area, it is possible to avoid excessive enhancement of resolution and to prevent speckles from standing out. Meanwhile, since the HPF is applied to the third area, it is possible to prevent excessive reduction of speckles.

The image filtering unit 530 may output the resultant filtered image to the display unit 720.

Figure 11A:
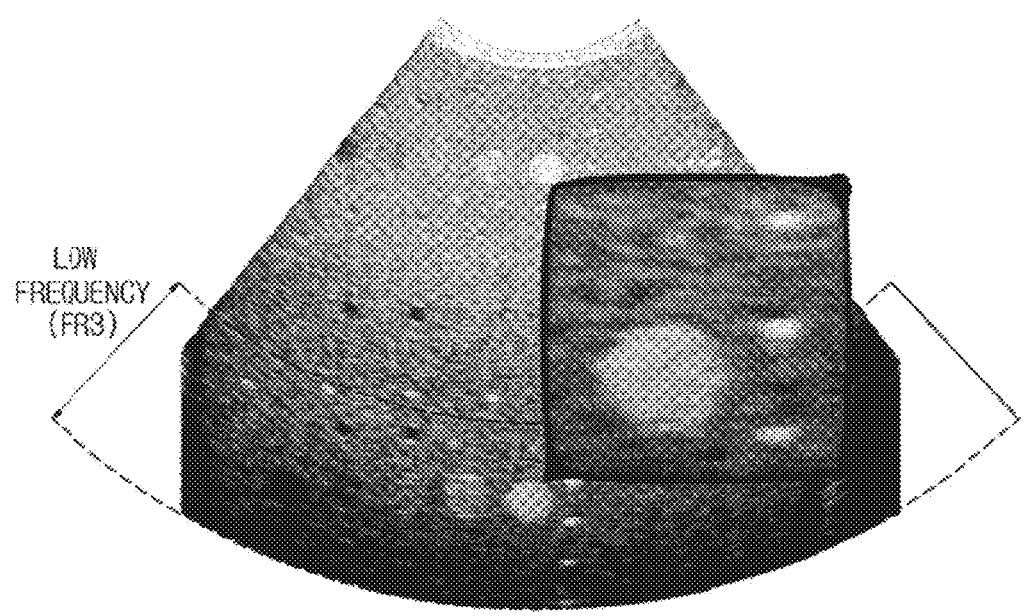
FIGS. 11A and 11B show a restored image and a filtered image of a low-frequency area of the ultrasound image shown in FIG. 8.
Figure 11B:
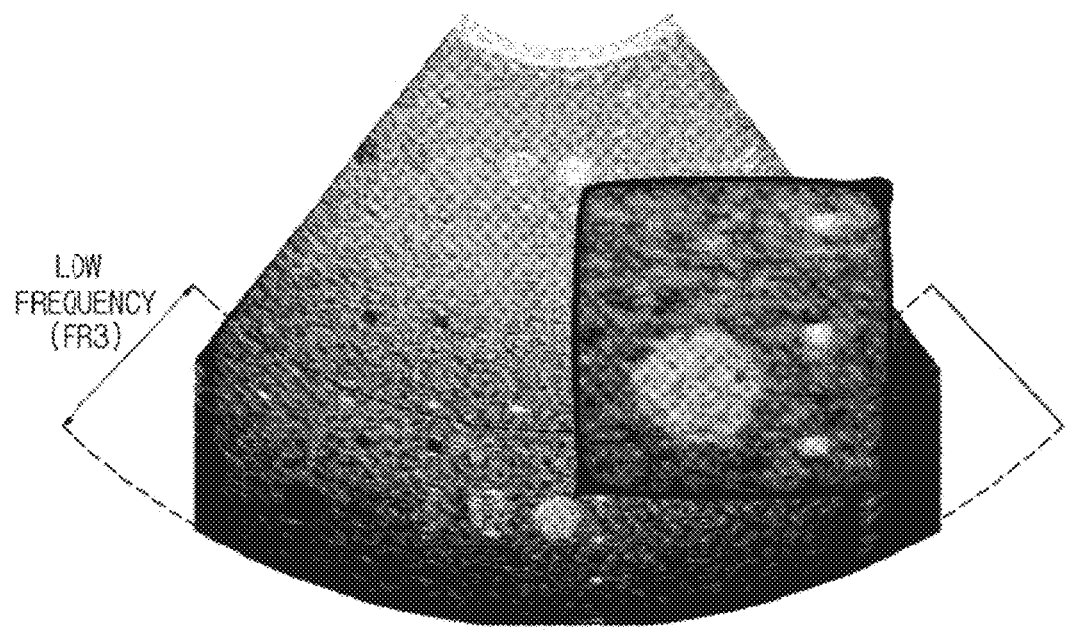

FIGS. 11A and 11B show a restored image and a filtered image of the low-frequency area of the ultrasound image shown in FIG. 8.

More specifically, FIG. 11A shows a restored image of the low-frequency area (the FR3 area), produced by deconvolving the FR3 area with the second PSF, and FIG. 11B shows the resultant image of the FR3 area, produced by applying an LPF to the restored image of FIG. 11A. The image of FIG. 11B shows no excessive reduction of speckles, and has enhanced resolution compared to the image of FIG. 11A.

Figure 12A:
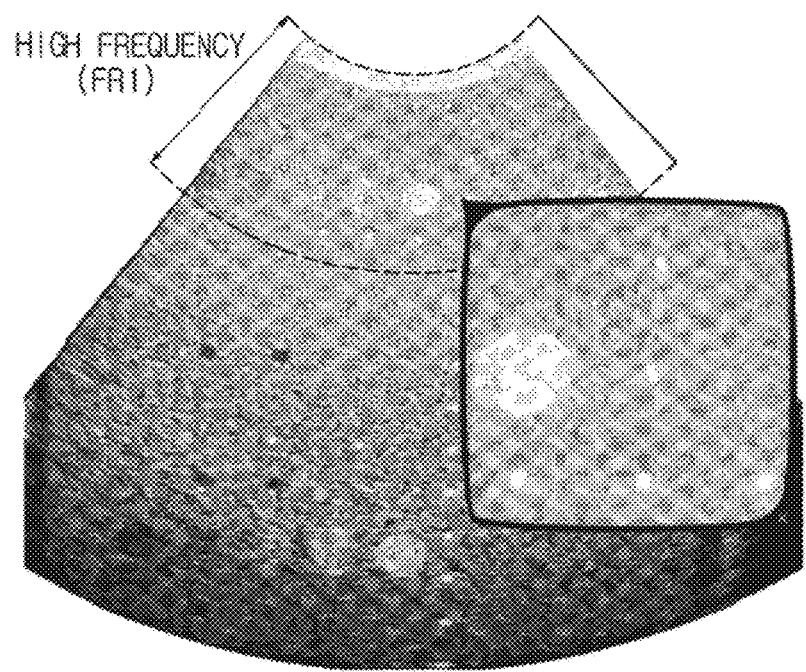
FIGS. 12A and 12B show a restored image and a filtered image of a high-frequency area of the ultrasound image shown in FIG. 8.
Figure 12B:
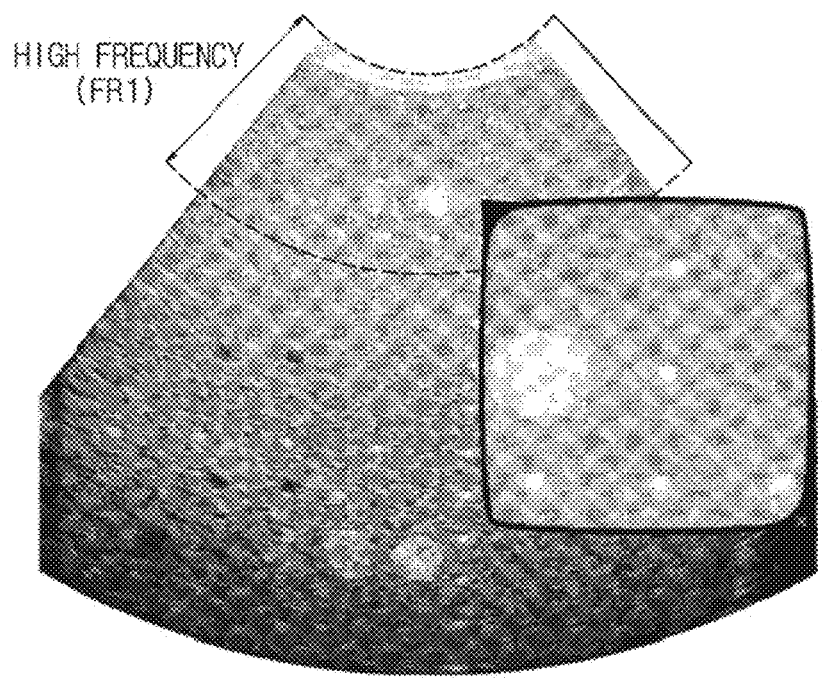

FIGS. 12A and 12B show a restored image and a filtered image of the high-frequency area of the ultrasound image shown in FIG. 8.

More specifically, FIG. 12A shows a restored image of the high-frequency area (the FR1 area), produced by deconvolving the FR1 area with the second PSF, and FIG. 12B shows the resultant image of the FR1 area, produced by applying an HPF to the restored image of FIG. 12A. In the image of FIG. 12B, excessive enhancement of resolution does not nearly appear, and speckles do not excessively stand out, compared to the image of FIG. 11A.

Figure 13A:
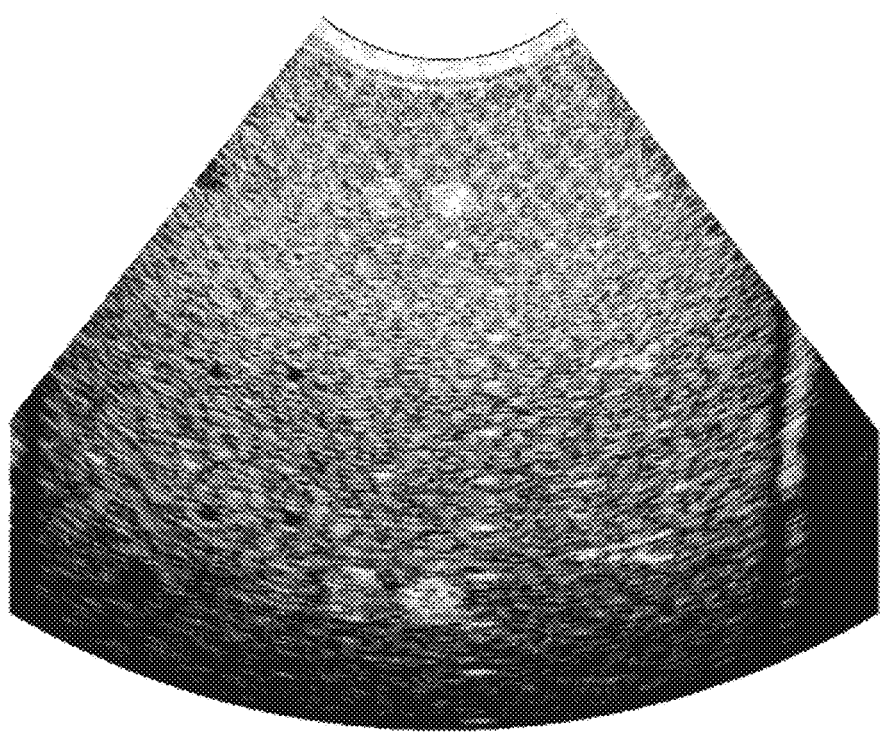
FIGS. 13A and 13B show examples of an ultrasound image and a filtered image.
Figure 13B:
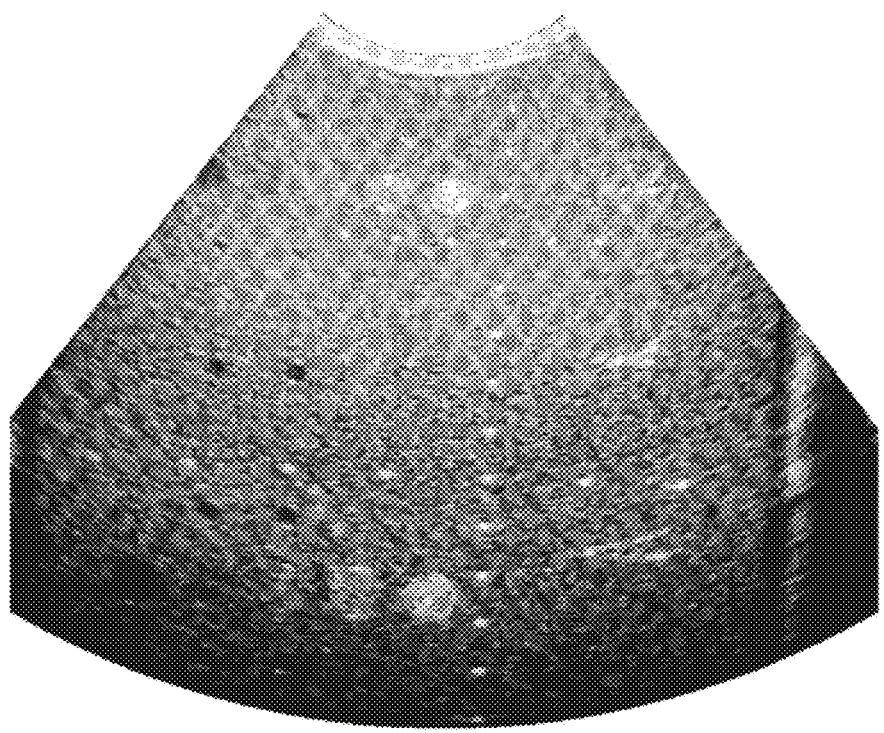

FIGS. 13A and 13B show examples of an ultrasound image and a filtered image. More specifically, FIG. 13A shows an example of an ultrasound image, and FIG. 13B shows an example of a filtered image.

As seen from FIG. 13, the low-frequency area of the ultrasound image has been enhanced in view of resolution, and the high-frequency area of the ultrasound image has been represented as a mild image. That is, the filtered image has uniform resolution over the entire area.

The components of the ultrasonic imaging apparatus 100, and the functions of the individual components, have been described above with reference to exemplary embodiments. Hereinafter, a control method of the ultrasonic imaging apparatus 100 will be described based on a flowchart.

FIG. 14 is a flowchart illustrating a control method of the ultrasonic imaging apparatus 100, according to an exemplary embodiment. The following description will be given with reference to FIGS. 2 and 14.

First, an ultrasound image may be received at operation 800.

The ultrasound image is an image corresponding to input signals I. The ultrasound image may have been modified due to the technical properties or physical properties of the probe 200 or the beamforming unit 350, and added with noise. Accordingly, the ultrasound image may have degraded image quality.

First PSFs may be estimated based on the ultrasound image at operation 810.

In order to estimate PSFs, a method of transforming an ultrasound image in the spatial domain into a Cepstrum domain, and then estimating 2D PSFs in the Cepstrum domain, that is, Cepstrum, can be used. When PSFs are estimated using the Cepstrum, first PSFs may be estimated in consideration of only magnitude information of an ultrasound image.

Then, situational variables of the ultrasound image may be determined using the first PSFs at operation 820.

The situational variables may include frequency components. The shapes or the degrees of spreading of the first PSFs may be compared to determine an area having a small degree of spreading of the first PSF as a high-frequency area, an area having a great degree of spreading of the first PSF as a low-frequency area, and an area having an intermediate degree of spreading of the first PSF as an intermediate-frequency area.

Thereafter, phase parameters and filter parameters may be selected based on the situational variables of the ultrasound image at operation 830.

An example of a method of selecting phase parameters is as follows. For the high-frequency area of the ultrasound image, a phase parameter ($\alpha_1$, $\beta_1$) corresponding to high-frequency among phase parameters stored in the phase parameter DB 610 may be selected. For the intermediate-frequency area of the ultrasound image, a phase parameter ($\alpha_2$, $\beta_2$) corresponding to intermediate-frequency among the phase parameters stored in the phase parameter DB 610 may be selected. Likewise, for the low-frequency area of the ultrasound image, a phase parameter ($\alpha_3$, $\beta_3$) corresponding to low-frequency among the phase parameters stored in the phase parameter DB 610 may be selected.

An example of a method of selecting filter parameters is as follows. For the high-frequency area of the ultrasound image, a filter parameter corresponding to an LPF among filter parameters stored in the filter parameter DB 620 may be selected. Also, for the intermediate-frequency area of the ultrasound image, a filter parameter corresponding to a BPF among the filter parameters stored in the filter parameter DB 620 may be selected. Likewise, for the low-frequency area of the ultrasound image, a filter parameter corresponding to an HPF among the filter parameters stored in the filter parameter DB 620 may be selected.

Thereafter, second PSFs may be estimated using the selected phase parameters at operation 840.

For example, referring to Equation (7), for the high-frequency area of the ultrasound image, a PSF $\hat{h}_{21}$ is obtained by using ($\alpha_1$, $\beta_1$) as a coefficient, that is, by applying ($\alpha_1$, $\beta_1$) to the phase parameter ($\alpha$, $\beta$). For the intermediate-frequency area of the ultrasound image, a PSF $\hat{h}_{22}$ is obtained by using ($\alpha_2$, $\beta_2$) as a coefficient. For the low-frequency area of the ultrasound image, a PSF $\hat{h}_{23}$ is obtained by using ($\alpha_3$, $\beta_3$) as a coefficient.

The PSFs $\hat{h}_{21}$, $\hat{h}_{22}$, and $\hat{h}_{23}$ are PSFs in the Cepstrum domain. Accordingly, Equation (8) is used to obtain a PSF $h_{21}$ by transforming $\hat{h}_{21}$ into the spatial domain, to obtain $h_{22}$ by transforming $\hat{h}_{22}$ into the spatial domain, and to obtain $h_{23}$ by transforming $\hat{h}_{23}$ into the spatial domain. The PSF $h_{21}$ may be estimated as a second PSF corresponding to the high-frequency area, the PSF $h_{22}$ may be estimated as a second PSF corresponding to the intermediate-frequency area, and the PSF $h_{23}$ may be estimated as a second PSF corresponding to the low-frequency area.

That is, when PSFs are estimated using the Cepstrum, the second PSFs may be estimated in consideration of both magnitude information and phase information of the ultrasound image. Accordingly, the second PSFs are closer to ideal PSFs than the first PSFs estimated in consideration of only magnitude information of the ultrasound image.

If the second PSFs are estimated, a restored image may be produced using the second PSFs at operation 850.

More specifically, the second PSFs may be deconvolved with the ultrasound image to produce a restored image for the ultrasound image.

That is, the second PSFs acquired in operation 840, that is, $h_{21}$, $h_{22}$, and $h_{23}$ may be respectively deconvolved with the corresponding frequency areas of the ultrasound image.

More specifically, the second PSF $h_{21}$ acquired for the high-frequency area may be deconvolved with the high-frequency area of the ultrasound image, the second PSF $h_{22}$ acquired for the intermediate-frequency area may be deconvolved with the intermediate-frequency area of the ultrasound image, and the second PSF $h_{23}$ acquired for the low-frequency area may be deconvolved with the low-frequency area of the ultrasound image, thereby producing a restored image for the entire area of the ultrasound image.

Then, the restored image may be filtered using the filter parameters selected in operation 830, and output at operation 860.

If an area corresponding to the high-frequency area of the ultrasound image in the restored image is defined as a first area, an area corresponding to the intermediate-frequency area of the ultrasound image in the restored image is defined as a second area, and an area corresponding to the low-frequency area of the ultrasound image in the restored image is defined as a third area, an LPF may be applied to the first area, a BPF may be applied to the second area, and an HPF may be applied to the third area, respectively. The resultant image filtered according to frequency areas may be output to the display unit 720 (see FIG. 1) so that a user can see an image about the inside of the object.

As described above with reference to FIG. 13, in the resultant image, the low-frequency area has been enhanced in view of resolution, and the high-frequency area has been represented as a mild image, compared to the ultrasound image, so as to help a user's ultrasonic diagnosis.

According to the ultrasonic imaging apparatus and the control method thereof, as described above, by detecting frequencies of input signals through ultrasound image analysis, and adaptively changing the shapes of PSFs that are used for image restoration and the shapes of filters that are used for image filtering, a high-resolution image can be acquired.

Although a few exemplary embodiments have been shown and described, it would be appreciated by those skilled in the art that changes may be made in these exemplary embodiments without departing from the principles and spirit of the exemplary embodiments, the scope of which is defined in the claims and their equivalents.

What is claimed is:
1. An ultrasonic imaging apparatus comprising:
an ultrasonic probe configured to receive ultrasonic waves reflected from an object, and to convert the ultrasonic waves into electrical signals;
a beamformer configured to perform beamforming on the electrical signals to thereby generate resultant signals, and to output the resultant signals;
an image restorer configured to:
estimate a first Point Spread Function (PSF) based on an ultrasound image corresponding to the outputted signals,
determine a first frequency component of the ultrasound image using the first PSF,
estimate a second PSF based on the first frequency component of the ultrasound image,
determine a second frequency component of the ultrasound image using the first PSF,
estimate a third PSF based on the second frequency component of the ultrasound image, and
generate a restored image for the ultrasound image using the second PSF and the third PSF; and
an image filter configured to filter the restored image based on the first frequency component of the ultrasound image, and to output the filtered image, wherein the image restorer estimates the first PSF using magnitude information of the ultrasound image, wherein the first frequency component corresponds to a first area of the ultrasound image, and the second frequency component corresponds to a second area of the ultrasound image different from the first area of the ultrasound image.

2. The ultrasonic imaging apparatus of claim 1, wherein the first PSF is estimated using only magnitude information of the ultrasound image, and the second PSF is estimated using the magnitude information and phase information of the ultrasound image.

3. The ultrasonic imaging apparatus according to claim 1, wherein the image restorer is configured to determine the first frequency component of the ultrasound image based on a shape of the first PSF.

4. The ultrasonic imaging apparatus according to claim 1, wherein the image restorer is configured to select a phase parameter based on the first frequency component of the ultrasound image, and estimate the second PSF using the selected phase parameter.

5. The ultrasonic imaging apparatus according to claim 1, wherein the image filter is configured to select a filter parameter based on the first frequency component of the ultrasound image, and filter the restored image using the selected filter parameter.

6. The ultrasonic imaging apparatus according to claim 5, wherein the image filter is configured to select a filter parameter corresponding to a low pass filter for a high-frequency area of the ultrasound image.

7. The ultrasonic imaging apparatus according to claim 5, wherein the image filter is configured to select a filter parameter corresponding to a band pass filter for an intermediate-frequency area of the ultrasound image.

8. The ultrasonic imaging apparatus according to claim 5, wherein the image filter is configured to select a filter parameter corresponding to a high pass filter for a low-frequency area of the ultrasound image.

9. The ultrasonic imaging apparatus according to claim 1, further comprising a storage configured to store at least one phase parameter and at least one filter parameter set in advance according to the first frequency component.

10. The ultrasonic imaging apparatus according to claim 1, wherein the image restorer is configured to estimate the first PSF and the second PSF using a Cepstrum technique of transforming the ultrasound image into a Cepstrum domain and estimating a 2-Dimensional (2D) PSF in the Cepstrum domain.

11. The ultrasonic imaging apparatus according to claim 1, wherein the image restorer is configured to deconvolve the ultrasound image with the second PSF to generate the restored image.

12. The ultrasonic imaging apparatus according to claim 1, wherein the image restorer is configured to generate the restored image by deconvolving the first area of the ultrasound image with the second PSF, and deconvolving the second area of the ultrasound image with the third PSF.

13. A control method of an ultrasonic imaging apparatus, comprising:
estimating a first Point Spread Function (PSF) based on an ultrasound image;
determining a first frequency component of the ultrasound image using the first PSF;
estimating a second PSF based on the first frequency component of the ultrasound image;
determining a second frequency component of the ultrasound image using the first PSF;

estimating a third PSF based on the second frequency component of the ultrasound image;
generating a restored image for the ultrasound image using the second PSF and the third PSF;
filtering the restored image based on the first frequency component of the ultrasound image; and
outputting the filtered image,
wherein the estimating of the first PSF comprises estimating the first PSF using magnitude information of the ultrasound image, and
wherein the first frequency component corresponds to a first area of the ultrasound image, and the second frequency component corresponds to a second area of the ultrasound image different from the first area of the ultrasound image.

14. The control method according to claim 13, wherein the determining of the first frequency component of the ultrasound image using the first PSF comprises determining the first frequency component of the ultrasound image based on a shape of the first PSF.

15. The control method according to claim 13, wherein the estimating of the second PSF based on the first frequency component of the ultrasound image comprises selecting a phase parameter based on the first frequency component of the ultrasound image, and estimating the second PSF using the selected phase parameter.

16. The control method according to claim 13, wherein the filtering of the restored image based on the first frequency component of the ultrasound image comprises selecting a filter parameter based on the first frequency component of the ultrasound image, and filtering the restored image using the selected filter parameter.

17. The control method according to claim 16, wherein the filtering of the restored image based on the first frequency component of the ultrasound image comprises selecting a filter parameter corresponding to a low pass filter for a high-frequency area of the ultrasound image.

18. The control method according to claim 16, wherein the filtering of the restored image based on the first frequency component of the ultrasound image comprises selecting a filter parameter corresponding to a band pass filter for an intermediate-frequency area of the ultrasound image.

19. The control method according to claim 16, wherein the filtering of the restored image based on the first frequency component of the ultrasound image comprises selecting a filter parameter corresponding to a high pass filter for a low-frequency area of the ultrasound image.

20. The control method according to claim 13, wherein the estimating of the first PSF or the estimating of the second PSF based on the ultrasound image comprises using a Cepstrum technique of transforming the ultrasound image into a Cepstrum domain and estimating a 2-Dimensional (2D) PSF in the Cepstrum domain.

21. An ultrasonic imaging apparatus comprising:
an ultrasonic probe configured to receive ultrasonic waves reflected from an object, and to convert the ultrasonic waves into electrical signals;
a beamformer configured to perform beamforming on the electrical signals to thereby generate resultant signals, and to output the resultant signals;
an image processor configured to:
estimate a first Point Spread Function (PSF) based on an ultrasound image corresponding to the outputted signals,
determine a first frequency component of the ultrasound image using the first PSF, estimate a second PSF based on the first frequency component of the ultrasound image, determine a second frequency component of the ultrasound image using the first PSF, estimate a third PSF based On the second frequency component of the ultrasound image, generate a restored image for the ultrasound image using the second PSF and the third PSF, and filter the restored image based on the first frequency component of the ultrasound image, and to output the filtered image, wherein the image processor estimates the first PSF using magnitude information of the ultrasound image, and wherein the first frequency component corresponds to a first area of the ultrasound image, and the second frequency compound corresponds to a second area of the ultrasound image different from the first area of the ultrasound image.

* * * * *